United States Patent
Steinhauser et al.

(10) Patent No.: US 8,775,042 B2
(45) Date of Patent: Jul. 8, 2014

(54) LINE PRESSURE CONTROL METHOD FOR A TRANSMISSION HAVING A DOG CLUTCH

(71) Applicant: ZF Friedrichshafen AG, Friedrichshafen (DE)

(72) Inventors: Klaus Steinhauser, Kressbronn (DE); Andreas Schmidt, Bavendorf (DE); Christian Villing, Langenargen (DE)

(73) Assignee: ZF Friedrichschafen AG, Friedrichschafen (DE)

( * ) Notice: Subject to any disclaimer, the term of this patent is extended or adjusted under 35 U.S.C. 154(b) by 0 days.

(21) Appl. No.: 13/692,190

(22) Filed: Dec. 3, 2012

(65) Prior Publication Data

US 2013/0151094 A1 Jun. 13, 2013

(30) Foreign Application Priority Data

Dec. 7, 2011 (DE) .......................... 10 2011 087 858

(51) Int. Cl.
*G06F 7/00* (2006.01)

(52) U.S. Cl.
USPC ............................................................ 701/60

(58) Field of Classification Search
CPC ............... F16H 2061/061; F16H 61/66259; F16H 2061/0078; B60K 2741/145; B60W 10/06
USPC ................... 701/51, 58, 60; 477/156–158
See application file for complete search history.

(56) References Cited

U.S. PATENT DOCUMENTS

2004/0083045 A1* 4/2004 Nohara et al. ................. 701/51
2011/0099994 A1 5/2011 Reisch et al.

FOREIGN PATENT DOCUMENTS

DE 10 2008 001 196 A1 10/2009

* cited by examiner

*Primary Examiner* — James Trammell
*Assistant Examiner* — Michael D Lang
(74) *Attorney, Agent, or Firm* — David & Bujold, PLLC; Michael J. Bujold

(57) ABSTRACT

A method of controlling the system pressure in an automatic transmission having interlocking shifting elements in which, during shifts and gear engagement and gear disengagement processes involving interlocking shifting elements, as a function of the engagement and disengagement times of the interlocking shifting elements involved and the shift conditions of the frictional shifting elements involved, the system pressure is increased to an elevated pressure that enables rapid engagement or disengagement of the interlocking shifting elements, in such manner that the system pressure is increased in at least two phases whose timing depends on the shift conditions of at least one of the shifting elements involved.

12 Claims, 1 Drawing Sheet

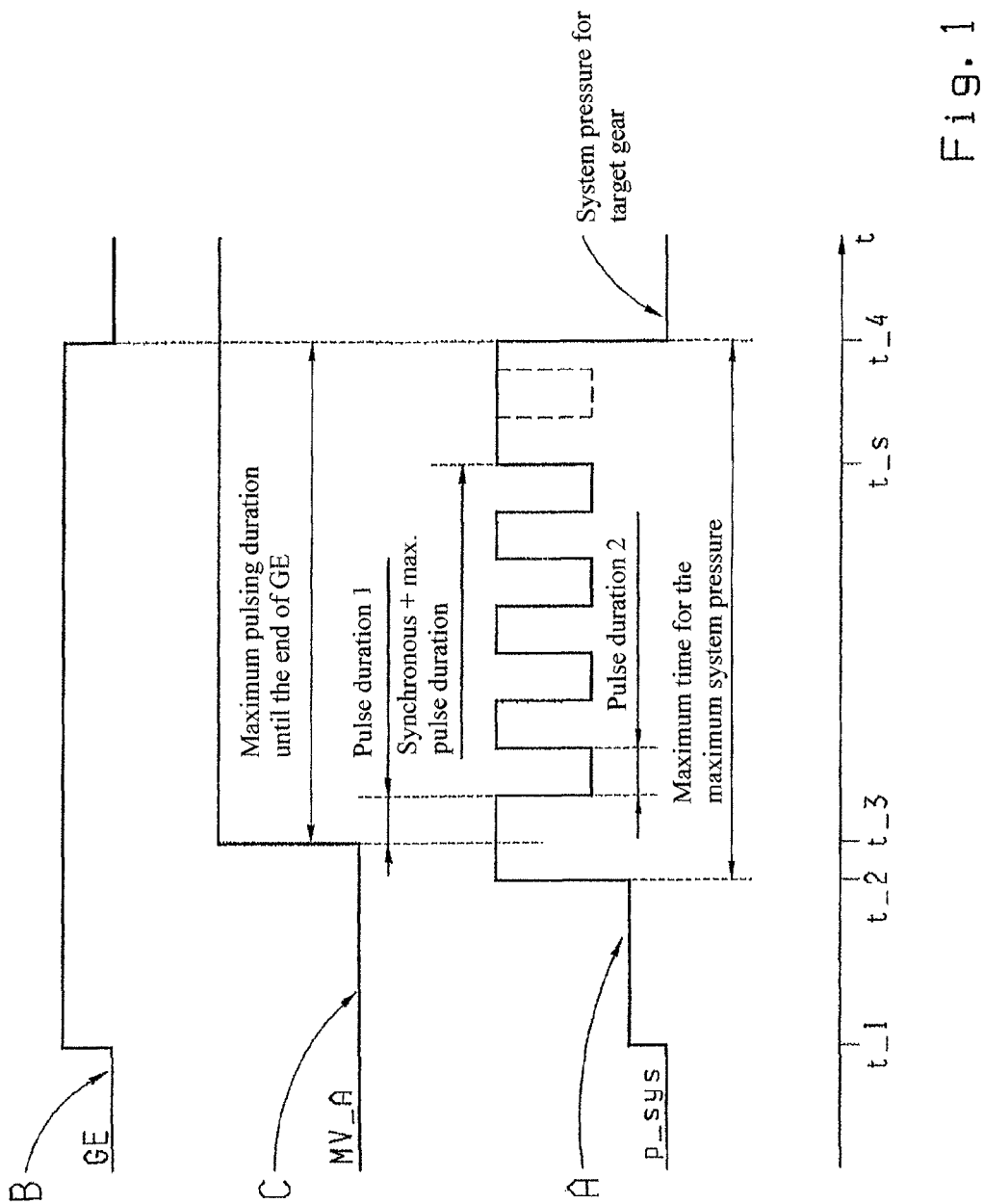

LINE PRESSURE CONTROL METHOD FOR A TRANSMISSION HAVING A DOG CLUTCH

This application claims priority from German patent application serial no. 10 2011 087 858.0 filed Dec. 7, 2011.

FIELD OF THE INVENTION

The present invention relates to a method for controlling the system pressure in an automatic transmission having interlocking shifting elements.

BACKGROUND OF THE INVENTION

From the prior art it is known to use interlocking or claw-type shifting elements in automatic transmissions, whereby drag torques are advantageously largely avoided. Furthermore, by virtue of their interlocking transfer mode, claw shifting elements need lower actuating forces and take up less structural space than disk shifting elements. As a rule, those shifting elements are made as interlocking shifting elements which are only disengaged during upshifts, or which are engaged as shifting elements only in the reversing gear.

In automatic transmissions with frictional shifting elements it is known from the prior art to control the system pressure separately from control systems for shifting elements and other, special control processes as a function of the transmission capacity of the shifting elements in the gear concerned, such that in the case of other control processes of shifting elements and components of the transmission the system pressure is controlled, as a function of the requirements during the other control processes, by the specification of a minimum or maximum pressure.

During shifts or gear engagement processes the system pressure is controlled as a function of the transmission capacity of the shifting elements in the condition before the shift or gear engagement and the transmission capacity of the shifting elements in the condition after a completed shift or after a completed gear engagement and as a function of a minimum pressure specification, in order to enable a sufficient pressure for filling the shifting elements. From these pressure fractions, by way of a maximum selection that pressure is calculated, which is produced during shifts or gear engagement processes.

Particularly in automatic transmissions with interlocking shifting elements, when disengaging or engaging the shifting elements it is necessary to enable a system pressure control which, while the lateral force on the interlock of the shifting elements has not been eliminated completely, provides an increased force in the respective engagement or disengagement direction.

DE 10 2008 001 196 A1 by the present applicant describes a hydraulically or pneumatically actuated interlocking shifting element comprising a hydraulically or pneumatically actuated piston having a piston space containing the hydraulic or pressure medium, a pressure medium inlet for the piston, a claw, and a counter-claw with which the claw engages in the engaged condition. In this known shifting element it is provided that the engagement speed of the claw in the event of a tooth-on-tooth position of the claws relative to one another is increased by decoupling the claws from the hydraulic or pneumatic volume flow and by prestressing the claw by means of a hydraulic or pneumatic pressure reservoir which is functionally connected to the piston and connected to the pressure medium inlet line.

SUMMARY OF THE INVENTION

The purpose of the present invention is to indicate a method for controlling the system pressure in an automatic transmission comprising interlocking shifting elements, by the implementation of which during the disengagement or engagement of the shifting elements the system pressure can be adjusted to a higher pressure in order to provide the displacement forces needed for rapid and comfortable disengagement or engagement. Furthermore, the system pressure control means should be designed such that the filling or pressure control of other shifting elements is not influenced unnecessarily.

Accordingly, a method for controlling the system pressure in an automatic transmission comprising interlocking shifting elements is proposed, in which, during shifts and gear engagement and gear disengagement processes involving interlocking shifting elements, as a function of the engagement and disengagement time-points of the interlocking shifting elements involved and of the shift conditions of the frictional shifting elements involved, a system pressure adjustment to a higher pressure level is carried out, which enables rapid engagement or disengagement of the interlocking shifting elements, the system pressure being increased in at least two phases whose timing depends on the shift conditions of at least one of the shifting elements involved.

If displacement or position information regarding the interlocking shifting elements is available, this information is used as a condition or an additional parameter for the system pressure control.

In particular, for the case of a shift in which an interlocking shifting element is disengaged and a frictional shifting element is engaged, the minimum system pressure during the shift is determined as a function of the shift conditions and from the maximum selection of the system pressures unrelated to the shifts. In this case the system pressure is increased in several pressure phases, such that in a first pressure phase, in which disengagement of the interlocking shifting element is not yet allowed, the system pressure is determined only as a function of the pressure required for filling the frictional shifting element which is being engaged.

In a second pressure phase, which preferably begins when torque starts to be transmitted by the frictional shifting element being engaged, the system pressure is increased in order to enable disengagement of the interlocking shifting element being disengaged.

In a third pressure phase, when the frictional shifting element being engaged is transmitting the torque completely, the system pressure is increased to its maximum value in order to ensure reliable and rapid disengagement of the interlocking shifting element.

According to the invention, the pressure phases are controlled as a function of the shifting phases of the frictional shifting element that is being engaged is therefore taking up torque, and in relation to the timing of the direct condition transitions of the shifting element being engaged this can be varied as a function of other parameters such as the temperature of the transmission oil, the torque to be transmitted and/or the rotational speed.

Furthermore, the time-point when the elevated system pressure, which corresponds to its maximum value, decreases from that value is determined as a function of the end of the shift or of displacement or position information regarding the interlocking shifting element. The transitions between the individual pressure phases can take place abruptly, in a ramp-like manner, with a specified pressure gradient or in a filtered manner. Moreover, additional adaptations of the pressure levels and of the time sequence are possible depending on the desired characteristics of the shift (comfortable, rapid, sporty, etc.).

In the case when a gear is engaged with the help of an interlocking shifting element that is being engaged, the minimum system pressure during the gear engagement is determined as a function of the reaching of the synchronous speed for the gear engagement and the actuation of the interlocking shifting element and from the maximum selection of system pressures unrelated to the gear engagement.

In this case the system pressure is increased in a number of pressure phases, such that in a first pressure phase before the engagement of the interlocking shifting element the system pressure is determined only as a function of the pressure required for filling the frictional shifting elements involved.

In a second pressure phase, which can preferably begin before the start of the engagement process or with the engagement of the interlocking shifting element being engaged, the system pressure is increased to its maximum value in order to, in this way, ensure reliable engagement.

The pressure phases are controlled as a function of certain events, for example the reaching of a speed threshold (for example the synchronous speed) or a speed difference, and the time phases relating to the events can be varied in time as a function of other parameters such as the transmission oil temperature, the torque to be transmitted and/or the rotational speed.

The time-point when the elevated system pressure corresponding to its maximum value decreases from that value, is determined as a function of the end of the gear engagement process or as a function of displacement or position information regarding the interlocking shifting element. The transitions between the individual pressure phases can take place abruptly, in a ramp-like manner, with a specified pressure gradient or in a filtered manner.

Furthermore, from the time when the interlocking shifting element is engaged during the engagement of the gear, the system pressure can be pulsed in order to assist the further meshing of the shifting element as far as the maximum depth. During this, pressure pulses between two applicable system pressure levels are produced with pulse peaks and pulse troughs that can be adjusted independently of one another. By this procedure a delay of the meshing process, for example caused by a tooth-on-tooth position, can largely be avoided.

In the case of a shift in which an interlocking shifting element is engaged, the minimum system pressure is determined as a function of reaching the synchronous speed for the meshing of the interlocking shifting element and of the actuation of the interlocking shifting element, and from the maximum selection of system pressures unrelated to the gear engagement.

In this case the system pressure is increased in a number of pressure phases, such that in a first pressure phase before the engagement of the interlocking shifting element the system pressure is determined only as a function of the pressure required for the frictional shifting elements involved to have the necessary transmission capacity.

In a second pressure phase, which preferably begins when the interlocking shifting element being engaged meshes, the system pressure is increased to its maximum value in order to, in this way, ensure reliable and rapid meshing.

In a variant of the invention the second pressure phase can be divided into two part-phases, such that the first part-phase lasts from the beginning of the meshing process until the moment when the claws of the interlocking shifting element first came into contact, when a tooth-on-tooth contact can also occur, so ensuring that the claws do not impact against one another too harshly, while in the second part-phase the system pressure is increased to its maximum value and complete meshing takes place.

The pressure phases are actuated as a function of particular events such as reaching a speed threshold or a speed difference, and the timing of the phases can be varied in relation to the events as a function of other parameters such as the transmission oil temperature, the torque to be transmitted and/or the rotational speed.

Furthermore, the transition between the two pressure phases when engaging the interlocking shifting element can be controlled as a function of additional displacement information regarding the interlocking shifting element if such displacement information is available.

The time-point when the elevated system pressure corresponding to its maximum value decreases from that value, is determined as a function of the end of the shift or as a function of displacement or position information regarding the interlocking shifting element. The transitions between the individual pressure phases can take place abruptly, in a ramp-like manner, with a specified pressure gradient or in a filtered manner.

Moreover, additional adaptations of the pressure levels and of the time sequences as a function of the desired shift characteristics (comfortable, rapid, sporty etc.) are possible.

In the case of a gear disengagement or when reversing from forward to reverse with an interlocking shifting element being disengaged, the minimum system pressure during the shift is determined as a function of the actuation of the interlocking shifting element and from the maximum selection of system pressures unrelated to the gear disengagement.

Since the engagement of a frictional shifting element is required for the disengagement of the interlocking shifting element, which relieves the interlocking shifting element from its tooth force, the minimum system pressure is also determined as a function of actuation conditions of this so-termed synchronization element.

In this case the system pressure is increased in a number of pressure phases, such that in the first pressure phase the synchronization element required for the disengagement of the interlocking shifting element is filled and as the system pressure only the filling pressure required for this is provided. The system pressure corresponds to the filling pressure required for filling the synchronization element.

In a second pressure phase the system pressure is increased as a function of the actuation of the interlocking shifting element in order to increase the separation force and ensure that disengagement takes place. In this case the system pressure can correspond to the maximum pressure.

The time phases that depend on the shifting phases of the synchronization element and on the actuation of the interlocking shifting element are varied as a function of further parameters such as the transmission oil temperature, the torque to be transmitted and/or the rotational speed.

Furthermore, the time-point when, in the second pressure phase, the system pressure decreases from its elevated value is determined as a function of the end of the gear disengagement or of displacement or position information regarding the interlocking shifting element. The transitions between the individual pressure phases can take place abruptly, in a ramp-like manner, with a specified pressure gradient or in a filtered manner.

BRIEF DESCRIPTION OF THE DRAWINGS

Below, the invention will be explained in more detail with reference to the attached FIGURE, considering the example of a variant of the method for the case of a gear engagement involving the engagement of an interlocking shifting element.

DETAILED DESCRIPTION OF THE PREFERRED EMBODIMENTS

During the gear engagement GE, for the engagement of an interlocking shifting element, according to the invention and referring to the attached FIGURE, the system pressure p_sys, whose time variation is shown by curve A, is increased in a number of pressure phases, such that in a first pressure phase before the meshing of the interlocking shifting element the system pressure is determined only as a function of the pressure required for filling the frictional shifting elements involved, so that the frictional shifting elements involved can be filled.

The first pressure phase begins at the start of the gear engagement GE at time t_1 and ends at time t_2. Curve B illustrates the function GE "gear engagement" as a function of time; the function GE is activated at time t_1 and completed at time t_4. The value of the system pressure p_sys before time t_1 corresponds to the system pressure p_sys in neutral. Curve C represents the time variation of the magnetic valve control MV for actuating the interlocking shifting element; the magnetic valve is actuated at time t_3.

The second pressure phase begins at time t_2, which is the time of transition between the first and second pressure phases, such that in the example shown the pressure increase takes place before the beginning of the meshing process and the actuation of the magnetic valve in order to enable the meshing process to be carried out without delay. In this second pressure phase the system pressure is preferably increased to its maximum value in order in this way to ensure a reliable and rapid meshing of the interlocking shifting element. In this case the transition between the first and second pressure phases takes place abruptly.

In the example illustrated, the time when the elevated system pressure begins to decrease corresponds to the time t_4 when the gear engagement ends, and the transition between the maximum pressure and the system pressure required for the target gear takes place abruptly.

In the example shown, from time t_3 which corresponds to the time when actuation of the magnetic valve begins, in the second pressure phase the system pressure is pulsed in order to assist the further meshing of the interlocking shifting element to the maximum depth. During this, pressure pulses are produced between two applicable system pressure levels with pulse peaks and pulse troughs that can be adjusted independently of one another, the value of the higher pulse level preferably being the maximum pressure.

By virtue of this procedure a delay of the meshing process can advantageously be avoided. The pulsing can be carried out at most until the end of the second pressure phase at time t_4. Alternatively, the pulsing can be carried out until the time t_s when the synchronous speed is reached.

| Indexes | |
|---|---|
| A | Time variation of the system pressure p_sys |
| B | Time variation of the "Gear engagement" function |
| C | Time variation of the magnetic valve actuation MV_A for actuating the interlocking shifting element |
| GE | Gear engagement function |
| p_sys | System pressure |
| MV_A | Magnetic valve actuation |
| t_1 | Time point when the gear engagement and the first pressure phase begin |
| t_2 | Time-point of the transition between the first and second pressure phases |
| t_3 | Time-point when the actuation MV_A of the magnetic valve begins |
| t_4 | Time-point when the gear engagement ends |
| t_s | Time-point when the synchronous speed is reached |

The invention claimed is:

1. A method of controlling a system pressure, in an automatic transmission having interlocking shifting elements, during shifts and gear engagement and gear disengagement processes in which the interlocking shifting elements are involved, the method comprising the steps of:
increasing the system pressure to an elevated pressure which enables either rapid engagement or disengagement of the interlocking shifting elements, increasing the system pressure based on time-points at which the interlocking shifting elements are engaged and disengaged, and shift conditions of frictional shifting elements involved with the shift, and
increasing the system pressure via at least two pressure phases, timing of the least two pressure phases depends on the shift conditions of at least one of the interlocking and the frictional shifting elements involved.

2. The method of controlling the system pressure in the automatic transmission according to claim 1, further comprising the step of varying the timing of the at least two pressure phases as a function of at least one of transmission oil temperature, a torque to be transmitted and a rotational speed.

3. The method of controlling the system pressure in the automatic transmission according to claim 1, further comprising the step of determining a time when the system pressure decreases, from the elevated pressure, as either a function of an end of one of the shift, the gear engagement and the gear disengagement process, or as a function of either path information or position information regarding the interlocking shifting element.

4. The method of controlling the system pressure in the automatic transmission according to claim 1, further comprising the step of abruptly transitioning between the at least two individual pressure phases in either a ramped manner, with a specified pressure gradient, or in a filtered manner.

5. The method of controlling the system pressure in the automatic transmission according to claim 1, further comprising the step of adapting pressure levels and the time sequences as a function of desired shift characteristics.

6. The method of controlling the system pressure in the automatic transmission according to claim 1, further comprising the steps of initiating a shift in which an interlocking shifting element is disengaged and a frictional shifting element is engaged, determining a minimum system pressure as a function of the shift conditions and from a maximum selection of system pressures unrelated to the shifts, precluding disengagement of the interlocking shifting element, determining the system pressure only as a function of a pressure required for filling the frictional shifting element involved, and, beginning to increase the system pressure when the frictional shifting element begins transmitting torque, increasing the system pressure so as to enable the disengagement of the interlocking shifting element being disengaged, and, increasing the system pressure to a maximum value when the frictional shifting element being engaged is completely transmitting the torque, to ensure reliable and rapid disengagement of the interlocking shifting element.

7. The method of controlling the system pressure in the automatic transmission according to claim 1, further comprising the step of, initiating a gear engagement in which an interlocking shifting element is engaged, determining a minimum system pressure during the gear engagement as a function of: reaching a synchronous speed for the gear engagement, actuation of the interlocking shifting element, and from a maximum selection of system pressures unrelated to the gear engagement so that, prior to engagement of the interlocking shifting element, determining the system pressure only as a function of a pressure required for filling the frictional shifting elements involved, and, either before a start of the engagement process or once the interlocking shifting element being engaged is engaged, increasing the system pressure to a maximum value so as to ensure a reliable engagement.

8. The method of controlling the system pressure in the automatic transmission according to claim 7, further comprising the step of, pulsing the system pressure during the gear engagement of the interlocking shifting element, to assist with further meshing of the shifting element to a maximum depth, pulsing the system pressure with system pressure pulses between two applicable system pressure levels, the system pressure pulses having pulse peaks and pulse troughs that are adjustable independently of one another.

9. The method of controlling the system pressure in the automatic transmission according to claim 1, further comprising the step of determining a minimum system pressure, during a shift in which the interlocking shifting element is engaged, as a function of reaching a synchronous speed for the engagement of the interlocking shifting element, actuation of the interlocking shifting element and from a maximum selection of system pressures unrelated to the gear engagement, prior to engagement of the interlocking shifting element, determining the system pressure only as a function of the pressure required for the transmission capacity of the frictional shifting elements involved, and, beginning the engagement of the interlocking shifting element being engaged, and increasing the system pressure to a maximum value to ensure reliable engagement of the interlocking shifting element.

10. The method of controlling the system pressure in the automatic transmission according to claim 9, further comprising the steps of initially increasing the system pressure in a first part-phase that lasts from the beginning of the engagement process until claws of the interlocking shifting element first contact each other so as to reduce an impact of he claws against one another, and increasing the system pressure in a second part-phase to the maximum value to ensure complete engagement of the interlocking shifting element.

11. The method of controlling the system pressure in the automatic transmission according to claim 1, further comprising the steps of determining a minimum system pressure, in either a gear disengagement or reversing from forward drive to reverse drive with an interlocking shifting element that is being disengaged, as a function of actuation of the interlocking shifting element and from a maximum selection of the system pressures unrelated to the gear disengagement, and, determining the minimum system pressure as a function of actuation conditions of a synchronizing element whose engagement is required for the disengagement of the interlocking shifting element, correlating the system pressure to a filling pressure that is required for filling the synchronizing element, and, increasing the system pressure as a function of the actuation of the interlocking shifting element so as to increase a separation force and ensure disengagement of the interlocking shifting element.

12. A method of controlling a system pressure, in an automatic transmission having interlocking and frictional shifting elements, during a gear shift in which the interlocking shifting element is disengaged and the frictional shifting element is engaged, the method comprising the steps of:
determining the system pressure of which the frictional shifting element begins engaging and transmitting torque therethrough,
increasing the system pressure to an elevated system pressure which facilitates rapid disengagement of the interlocking shifting elements, increasing the system pressure as a function of time-points when the interlocking shifting elements are disengaged and as a function of shift conditions of the frictional shifting elements, and
utilizing first and second phases, for increasing the system pressure, and determining a duration of the first and the second phases depending on the shift conditions of at least one of the interlocking and the frictional shifting elements.

* * * * *